United States Patent [19]

Noorigian

[11] 4,378,473

[45] Mar. 29, 1983

[54] RETRACTABLE DROP LIGHT

[76] Inventor: Kenneth C. Noorigian, 1700 Tilton's Corner Rd., Wall Township, Monmouth County, N.J. 07719

[21] Appl. No.: 232,266

[22] Filed: Feb. 5, 1981

[51] Int. Cl.³ .............................................. H02G 11/00
[52] U.S. Cl. .............................. 191/12.2 R; 339/58 L; 339/119 C; 200/60; 200/153 F
[58] Field of Search ..................... 191/12.2 R, 12.2 A, 191/12.4; 200/153 F, 60; 339/5 RL, 6 RL, 8 RL, 119 C

[56] References Cited

U.S. PATENT DOCUMENTS 1,975,419 10/1934 Grube ......................... 191/12.2 R X
2,998,277 8/1961 Himel ............................. 191/12.2 R

*Primary Examiner*—Richard A. Schacher
*Attorney, Agent, or Firm*—Lerner, David, Littenberg & Samuel

[57] ABSTRACT

A locking and release mechanism for use in connection with retractable drop lights is disclosed including a spring loaded reel mounted for rotational movement so that a conductor for the drop light can be reeled and unreeled therefrom. The mechanism includes a ratchet rotatable with the reel, a pawl pivotably mounted adjacent to the ratchet so that the pawl can be rotated between positions engaging the ratchet and disengaging the ratchet, thus permitting the spring loaded reel to rewind the conductor, a solenoid for pivoting the pawl between those two positions, and a switch located in proximity to the drop light itself for connection to the solenoid through the conductor so that the solenoid can be selectively activated from that switch location.

6 Claims, 4 Drawing Figures

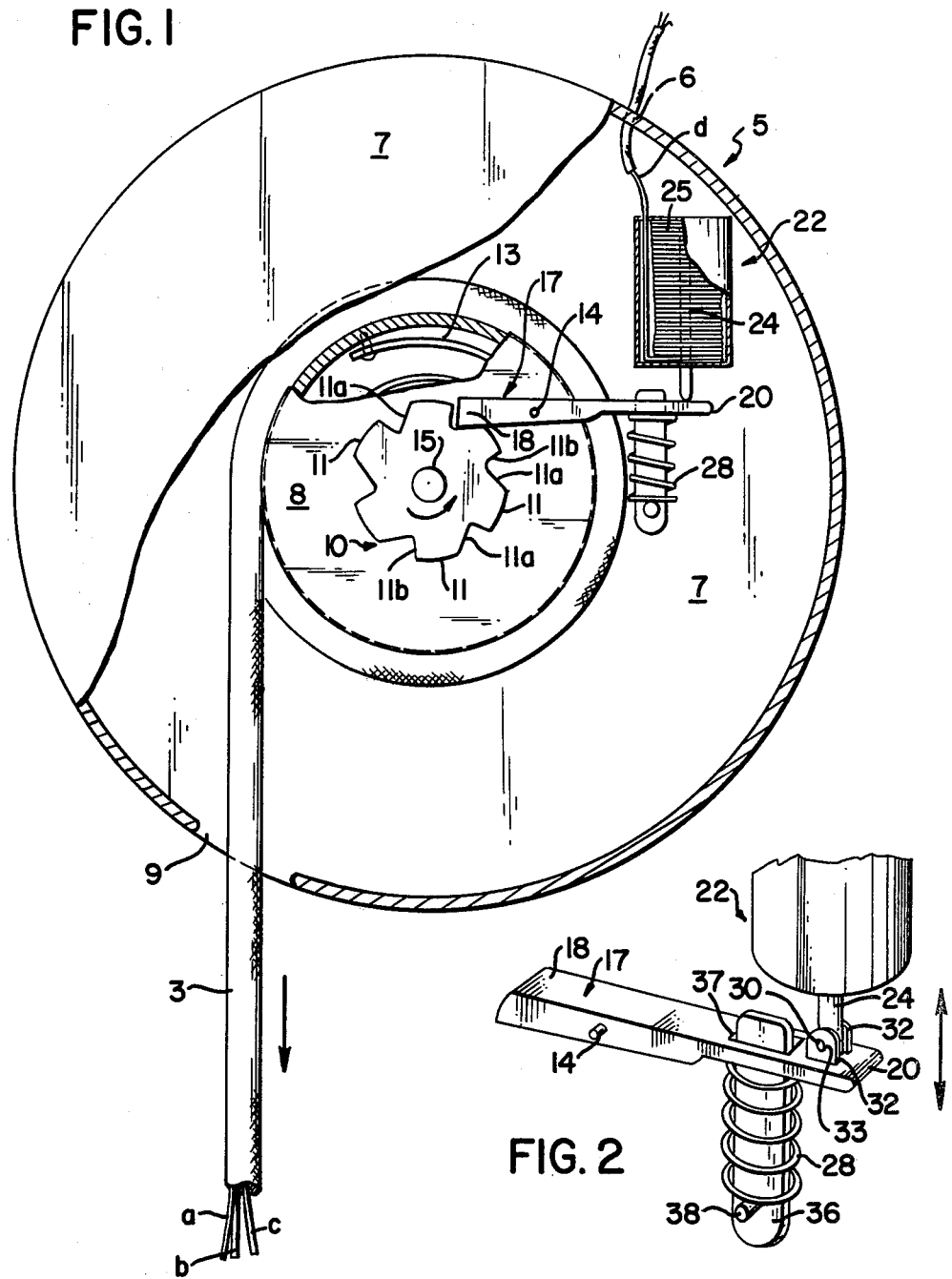

RETRACTABLE DROP LIGHT

FIELD OF THE INVENTION

The present invention is directed to locking and release mechanisms for use in connection with reeling and unreeling equipment. More particularly, the present invention is directed to locking and releasing mechanisms for use in connection with the reeling and unreeling of electrical equipment, such as drop lights and the like. Still more particularly, the present invention relates to locking and release mechanisms which utilize electrically operated means for controlling the reeling and unreeling mechanisms therein.

BACKGROUND OF THE INVENTION

Numerous mechanisms are known in the prior art for use in connection with the reeling and unreeling of cords and wires of various types. These various known mechanisms, which are utilized both in connection with electrical equipment and mechanical devices, also may include various locking devices, which are intended to prevent the unintentional rewinding of the reel under various conditions and in various environments.

The most common mechanical types of reeling and unreeling mechanisms which can be "locked" into position to prevent rewinding except when desired are of the type commonly used in households for lowering blinds and curtains. These generally require that the cord be pulled in a desired direction in order to activate and deactivate such mechanical locking mechanisms.

The state of the art with respect to these various locking mechanisms is represented, for example, by U.S. Pat. No. 875,280 to McGavin. This patent thus includes a typical arrangement which employs a lever 12 and a screw 13 to engage a ratchet wheel so that upon pulling of a cord the lever is moved to withdraw the screw from the ratchet's teeth and permit rewinding under the force of spring 9. In connection with lighting fixtures in general, such devices are shown in patents such as U.S. Pat. No. 1,559,092 to Hallberg and U.S. Pat. No. 488,298 to Welsh.

The application of such devices to the winding and unwinding of electrical cords is represented, for example, by U.S. Pat. No. 4,114,273 to McGaha. This patent relates generally to dental equipment, and includes a mechanism for reeling and unreeling various dental instruments. The apparatus disclosed in this patent, as shown in FIGS. 6 and 7 thereof, utilizes an electrically actuated magnetic coil 50 which, when actuated, magnetically attracts pawls 46 moving into and out of engagement with a ratchet wheel 45. The magnetic coil 50 is electrically actuated, and a rather sophisticated arrangement, employing an electric eye, is shown for controlling same. This patentee also discusses the use of a switch 58 to manually operate the entire circuit.

In connection with various drop lights, particular problems have been encountered, none of which are overcome by these mechanisms which are known in the art. For example, in addition to being involved with electrical equipment, namely a light, drop lights generally employ extremely long conductors. This is normally the case because of the fact that the reeling and unreeling mechanism employed may be located long distances from the location where the light is intended to be used, such as being attached to high ceilings, etc. In addition, the light itself must be used in a confined area, and must be readily accessible and controllable. The devices employed in the past in connection with such an apparatus are generally of the conventional types discussed above, including the normal locking mechanisms which require one to pull on the conductor itself in order to release mechanical lock means and permit rewinding under the action of the spring loaded reel. In view of the length of the conductors generally utilized in this area, the dangers associated with this device have been considerable. For example, unintended release of the locking mechanism, such as by inadvertent movement of the wire, individuals tripping over the long conductors, etc., can result in the drop lights inadvertently rewinding, with concomitant potential damage to equipment, injuries to personnel, etc.

SUMMARY OF THE INVENTION

In accordance with the present invention, a locking and release mechanism for use in connection with retractable drop lights has now been developed which overcomes these problems and provides a safe and readily accessible mechanism for such purposes. In particular, a locking and release mechanism has now been developed for such use which includes a spring loaded reel member mounted for rotational movement whereby a conductor means for the drop light can be reeled onto the reel member and unreeled therefrom. The mechanism includes a ratchet member fixed to the reel member for rotation therewith, a pawl member pivotably mounted adjacent to the ratchet member, the pawl member pivotable between first and second positions, whereby the pawl member engages the ratchet member when the pawl member is in its first position so as to prevent the reel member from rewinding, and alternately the pawl member disengages from the ratchet member when in its second position in order to permit the pawl member to freely rewind under the influence of the spring controlling the reel member, electrically operated means for pivoting the pawl member between those first and second positions, and switch means located in proximity to the drop light for connection to the electrically operated means through the conductor means whereby the electrically operated means can be selectively activated from a location proximate to the drop light itself.

In a preferred embodiment of the present invention, the electrically operated means comprises a solenoid means. Thus, the pawl member preferably is pivotably mounted upon an axle member, and the pawl member includes a first end and a second end. The first end of the pawl member engages the ratchet member when the pawl member is in its first position, and the second end of the pawl member is associated with the solenoid means. In connection with this embodiment, the second end of the pawl member is in engagement with the core of the solenoid, and spring means are provided associated with the solenoid core, the spring means engaging the second end of the pawl member and urging the pawl member to rotate about the axle member so that the first end of the pawl member will engage the ratchet member. Thus, activation of the solenoid member, thus causing the solenoid core to move with respect to the solenoid, is necessary to overcome the spring means in order for the pawl member to be pivotably moved into its second position, thus permitting the conductor to rewind onto the reel member under the action of the spring associated with the reel members.

In accordance with a preferred embodiment of the present invention, the drop light includes a handle and the switch means is located on that handle. Preferably, the switch means comprises a push button switch, whereby pressure of the push button is required in order to activate the electrically operated member or solenoid member and to move the pawl into its second position so as to permit rewinding of the conductor.

The present invention, as well as other objects, features, and advantages thereof, can be more fully understood with respect to the following detailed description, when taken in conjunction with the accompanying drawings, wherein:

BRIEF DESCRIPTION OF THE DRAWINGS

FIG. 1 is a side, elevated, partially sectional view, of the locking and release mechanism of the present invention in conjunction with a reel;

FIG. 2 is a partial, perspective view of a portion of the locking and release mechanism shown in FIG. 1;

DETAILED DESCRIPTION OF THE PREFERRED EMBODIMENT

Figure 3:
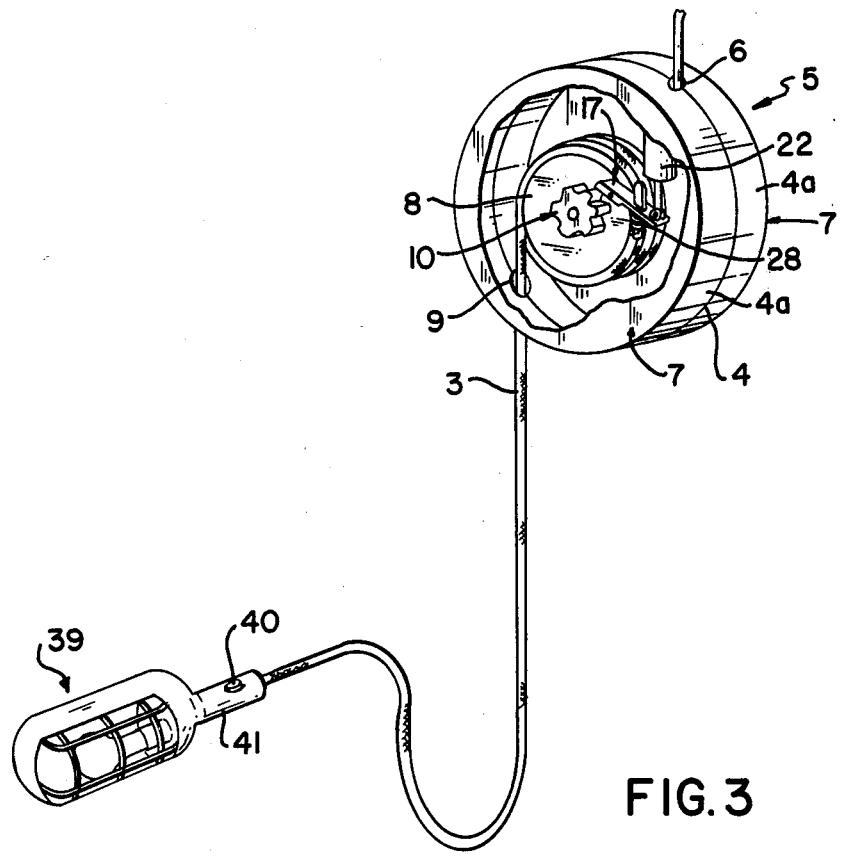
FIG. 3 is a perspective, partially representational view of the overall locking and release mechanism and retractable drop light system of the present invention.

Referring to the figures, in which like numerals refer to like portions thereof, a conductor 3, which may be of a considerable length, is wound around the central axis of a reel 5. The reel 5 is of conventional design, and includes two side walls 7 defining its front and back faces, and its circumference may be enclosed by annular face 4, which can include two mating halves 4a. These halves define the aperatures 6 and 9, for accommodating an electrical lead d and the conductor 3, respectively. The reel itself may be mounted by any of a number of conventional means. The conductor 3 is wound around the central core 8 which extends between the two faces 7 of the reel 5. Rotating with reel 5 at its central core 8 is a ratchet member 10. The ratchet member 10 includes a number of ratchet teeth 11 of conventional design. The reel itself is of a spring loaded type, i.e., actuated by spring 13 which, as shown in FIG. 1, is affixed to the inner wall of central core 8 and to the main reel axle 15 so as to cause the reel to rewind, i.e., to rotate in a clockwise direction so as to rewind the conductor 3 onto the reel core 8. Again, however, any conventional means for effecting the rewinding aperature may be utilized, and does not form a part of the present invention. Pivotably mounted on an axle 14 which is mounted adjacent to ratchet 10 is pawl 17. As shown in more detail in FIG. 2, pawl 17 includes a ratchet engaging end 18, and extending therefrom, on the other side of axle 14, a control end 20. Thus, when the pawl 17 is in the position shown in FIG. 1, i.e., in engagement with one of the teeth 11 of ratchet wheel 10, the rewinding of reel 5 is halted, and the mechanism is considered to be in its locked position. Further, unwinding of the conductor 3 is not prevented in any way by the position of pawl 17, and the conductor may be pulled in the direction of the arrows shown in FIG. 1 so that the reel unwinds in a counterclockwise direction, i.e., the pawl 17 merely moves across the sloped surfaces 11a ratchet teeth 11. However, when the unwinding operation is terminated, again as shown in FIG. 1, the ratchet engaging end 18 of pawl 17 engages ratchet teeth 11 on their substantially planar face 11b, thus preventing any further rewinding.

By pivoting pawl 17 in a clockwise direction about axle 14, however, the ratchet engaging end 18 of pawl 17 is raised out of engagement with the ratchet teeth 11, and free rewinding of reel 5 in the clockwise direction under the action of spring 13 is permitted.

Turning to the means shown in FIGS. 1 and 2 for accomplishing this rotational movement of pawl 17, reference is made to solenoid 22. Solenoid 22 is located in proximity to the control arm 20 of pawl 17. Thus, the core 24 of solenoid 22, around which coil 25 is wound, is normally in the position shown in FIG. 1, i.e., when solenoid 22 has not been activated, and coil 25 has not been energized. However, upon energizing coil 25, the core 24 of the solenoid 22 moves downwardly as shown in FIG. 1, i.e., out of the solenoid (which is of the push-type) as shown therein. The end of core 24 of solenoid 22 is attached to the control arm 20 of pawl 17 by means of a pin 30, which passes through an aperature in solenoid core 24, and is affixed at its ends to a pair of ears 32 affixed to the upper surface of pawl 17, such as by passing through aperature 33 in these ears 32 corresponding to the aperature in solenoid core 24. In this manner, movement of the core 24 downwardly causes control arm 20 to move in a clockwise or downward direction as shown in FIGS. 1 and 2, pivoting about axle 14, and thus causing ratchet engaging end 18 of pawl 17 to move upwardly, and out of engagement with the ratchet teeth 11.

Furthermore, for control purposes, and in order to ensure that any time the solenoid 22 has not been activated, the locking mechanism will prevent rewinding by being in the position shown in FIG. 1, a solenoid spring 28 is in engagement with the bottom side of the control arm 20 of the pawl 17. The spring 28 surrounds a fixed arm 36, which is fixed in the position shown in FIGS. 1 and 2. Thus, its upper end projects through orifice 37 in pawl 17, and its lower end includes a stop pin 38. Spring 28 thus rests on stop pin 38 and the lower face of pawl 17. Thus, when the apparatus is in the configuration shown in FIG. 1, the spring 28 has not been compressed, but it is in engagement with the lower surface of the control arm 20 of the pawl 17. However, when solenoid 22 is activated, as shown in FIG. 3, and the core 24 of the solenoid 22 moves downwardly, thus pivoting the pawl 17 into the position shown in FIG. 3, compression of the solenoid spring 28 is effected. In this manner, upon deactivation of the coil 25 of solenoid 22, and withdrawal of the core back into the solenoid 22, the tension in the solenoid spring 28 pivots the pawl 17 back into the position shown in FIG. 1, i.e., in a counterclockwise direction, so as to prevent any further rewinding of reel 5. Another distinct advantage of this electrically operated mechanism is that the entire conductor 3 can now be utilized. That is, many of the mechanisms utilized in the past required that the conductor be pulled further or unreeled some distance in order to activate the rewinding means. This, in turn, makes it necessary to leave a length of conductor on reel 5 available for such purposes. This is no longer required by employing the present invention.

Of course, many alternate configurations of this device may be utilized, such as where a pull-type solenoid is employed, or other arrangements may be envisioned whereby the pawl is pivoted into and out of engagement with the ratchet wheel by activation of various conventional solenoids. However, the push-type solenoid shown in the drawings, and discussed above, is highly preferred. The reason for this is that in such an arrangement, the strongest portion of the stroke of core 24 upon activation of the solenoid is the initial portion of that stroke. Upon such initial activation the core is entirely within the solenoid coil, and therefore substantially the entire coil acts upon the core, causing it to move rapidly out of the core. This allows for much better control of the rewinding operation.

Figure 4:
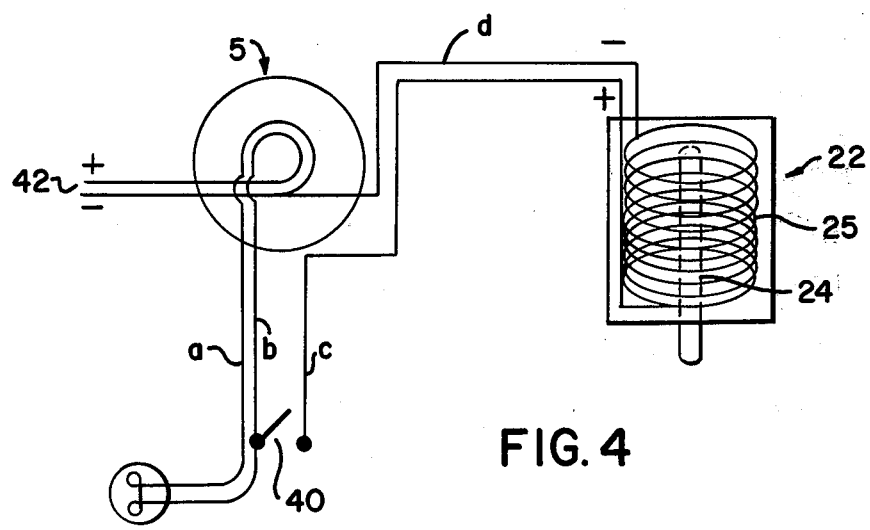
FIG. 4 is a representational diagrammatic view of the electrical operation of the locking and release mechanism of the present invention.

The principle requirement of the present mechanism, however, is that such an electrical operating member as the solenoid is provided which can be controlled by a switch located on the drop light, i.e., at the other end of the conductor being unreeled. In this case, as shown in FIGS. 1 and 3, the conductor includes three separate wires therein. Two of the wires, a and b, are used to operate the light itself, while the third wire, c, is connected to the solenoid or other electrical operating member by means of a switch 40, such as the push button switch shown in FIG. 3. Activation of switch 40 thus directly controls the solenoid through the wire c in the conductor 3. As noted above, this provides for control of the locking mechanism from a remote location with respect to the reeling and unreeling mechanism, that is from a point which is proximate to the light 39, such as on the drop light handle 41, as is shown in FIG. 3. On the other hand, it also permits the free operation of the reeling and unreeling mechanism without interference by any control mechanism. In this manner, all the advantages and objects of the present invention can be realized in a simple and efficient manner. Furthermore, the preferred use of a push-button type switch 40 permits continuous control of the rewinding operation. That is, switch 40 in such case remains closed only so long as the push-button is depressed. As soon as it is released, contact is broken, and rewinding is terminated, In this manner, inadvertent continued rewinding is prevented, and the operator can easily move the drop light 39 to new locations, etc. The wires a and b are conventionally connected to a power source 42. This may normally be accomplished by utilizing a metal disc which rotates with the reel 5, and which is in continuous contact with an end of wires a and b by means of a conventional rotating contact so that the spinning conductor can be in electrical connection with a fixed location, and thus with power or voltage source 42. As shown in FIG. 4, the other lead wire d for solenoid 22 is similarly connected to power source 42.

The above description and the drawings herein have set forth a preferred embodiment of the present invention, and the present invention is not intended to be limited to that particular embodiment in any sense. The present invention is thus specifically designed with respect to the following claims.

What is claimed is:

1. A locking and release mechanism for use in connection with a retractable drop light comprising a spring loaded reel member mounted for rotational movement whereby a conductor means for said drop light may be reeled and unreeled from said spring loaded reel member, a ratchet member fixed to said reel member for rotation therewith, a pawl member pivotably mounted adjacent to said ratchet member, said pawl member pivotable between first and second positions, said first position being the normal rest position for said pawl member, whereby said pawl member engages said ratchet member when said pawl member is in said first position so as to prevent said reel member from rewinding under the force of said spring loaded reel member, and said pawl member disengages from said ratchet member when said pawl member is in said second position so as to permit said reel member to freely rewind under the influence of said spring, electrically operated means for pivoting said pawl member from said first position to said second position only upon activation of said electronically operated means, and switch means located in proximity to said drop light for connection to said electrically operated means through said conductor means whereby said electrically operated means may be selectively activated from a location proximate to said drop light for remotely controlling said pawl member between said first and second positions.

2. The locking and release mechanism of claim 1 wherein said electrically operated means comprises solenoid means.

3. The locking and release mechanism of claim 2 wherein said pawl member is pivotably mounted on an axle member, and said pawl member includes a first end and a second end, said first end of said pawl member engaging said ratchet member when said pawl member is in said first position, and said second end of said pawl member being associated with the core of said solenoid means.

4. The locking and release mechanism of claim 3 wherein said second end of said pawl member is in engagement with said core of said solenoid means, and including spring means associated with said core, said spring means engaging said second end of said pawl member and urging said pawl member to rotate about said axle member so that said first end of said pawl member engages said ratchet member, whereby said solenoid means must overcome said spring means in order to pivot said pawl member into said second position to thereby permit said reel member to freely rewind.

5. The locking and release mechanism of claim 1 wherein said drop light includes a handle and said switch means is located on said handle.

6. The locking and release mechanism of claim 1 wherein said switch means comprises a push button switch, whereby when said push button is depressed, said electrically operated member is activated and said pawl member is thereby pivoted into said second position.

* * * * *